United States Patent
Gogate

(10) Patent No.: US 10,893,143 B2
(45) Date of Patent: *Jan. 12, 2021

(54) METHOD AND SYSTEM FOR AUTOMATIC DETECTION OF AGENT AVAILABILITY TO ATTEND A SCHEDULE AND REASSIGNMENT THEREOF

(71) Applicant: NICE LTD, Ra'anana (IL)

(72) Inventor: Suhas Suresh Gogate, Pune (IN)

(73) Assignee: NICE LTD, Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,020

(22) Filed: Jun. 15, 2020

(65) Prior Publication Data

US 2020/0314241 A1  Oct. 1, 2020

Related U.S. Application Data

(63) Continuation of application No. 16/792,347, filed on Feb. 17, 2020, now Pat. No. 10,728,390, which is a continuation of application No. 16/033,358, filed on Jul. 12, 2018, now Pat. No. 10,609,217.

(51) Int. Cl.
*H04M 3/00* (2006.01)
*H04M 3/51* (2006.01)

(52) U.S. Cl.
CPC .... *H04M 3/5175* (2013.01); *H04M 2203/402* (2013.01); *H04M 2203/558* (2013.01)

(58) Field of Classification Search
CPC ............ H04M 3/5175; H04M 3/5183; H04M 3/5191; H04M 3/5232; H04M 3/5233; H04M 3/5235; H04M 3/5238

USPC ................. 379/265.1, 265.4, 265.11, 266.07
See application file for complete search history.

(56) References Cited

U.S. PATENT DOCUMENTS

| | | | | |
|---|---|---|---|---|
| 5,216,488 A | * | 6/1993 | Tguunanen | G01N 21/253 250/576 |
| 8,963,674 B2 | * | 2/2015 | Lee | H01F 21/12 336/200 |
| 9,787,840 B1 | * | 10/2017 | Neuer, III | H04M 3/5232 |
| 2003/0235287 A1 | * | 12/2003 | Margolis | H04L 29/06027 379/265.01 |
| 2003/0235288 A1 | * | 12/2003 | McCormack | H04M 3/523 379/265.02 |
| 2004/0081309 A1 | * | 4/2004 | Bickford | H04M 3/51 379/265.02 |

(Continued)

*Primary Examiner* — Rasha S Al Aubaidi
(74) *Attorney, Agent, or Firm* — Soroker Agmon Nordman

(57) ABSTRACT

A computerized method for automatic detection of an availability of an agent to attend a schedule of customer calls in a call center and reassignment thereof may include assessing an agent availability to attend a schedule in a predefined time interval before a starting time of the schedule. If the assigned agent is not available, candidate agent availability may be assessed from a plurality of schedules to participate in the schedule of the unavailable agent. One or more candidate agents from a plurality of agents may be identified to replace the unavailable assigned agent based on the candidate agent availability. A replacement agent chosen from the one or more candidate agents may be assigned based on skills or preferences for each of the one or more identified candidate agents. A supervisor may be notified that the chosen replacement agent will attend the schedule in place of the unavailable assigned agent.

23 Claims, 5 Drawing Sheets

(56) References Cited

U.S. PATENT DOCUMENTS

| | | | |
|---|---|---|---|
| 2006/0256949 A1* | 11/2006 | Noble, Jr. | H04M 3/5231 |
| | | | 379/265.01 |
| 2006/0262921 A1* | 11/2006 | Eppel | H04M 3/523 |
| | | | 379/265.02 |
| 2011/0173040 A1* | 7/2011 | Curtis | G06Q 10/06311 |
| | | | 705/7.13 |
| 2014/0153703 A1* | 6/2014 | Desai | H04M 3/5166 |
| | | | 379/88.01 |
| 2016/0065732 A1* | 3/2016 | Davis | H04M 3/51 |
| | | | 379/265.02 |

* cited by examiner

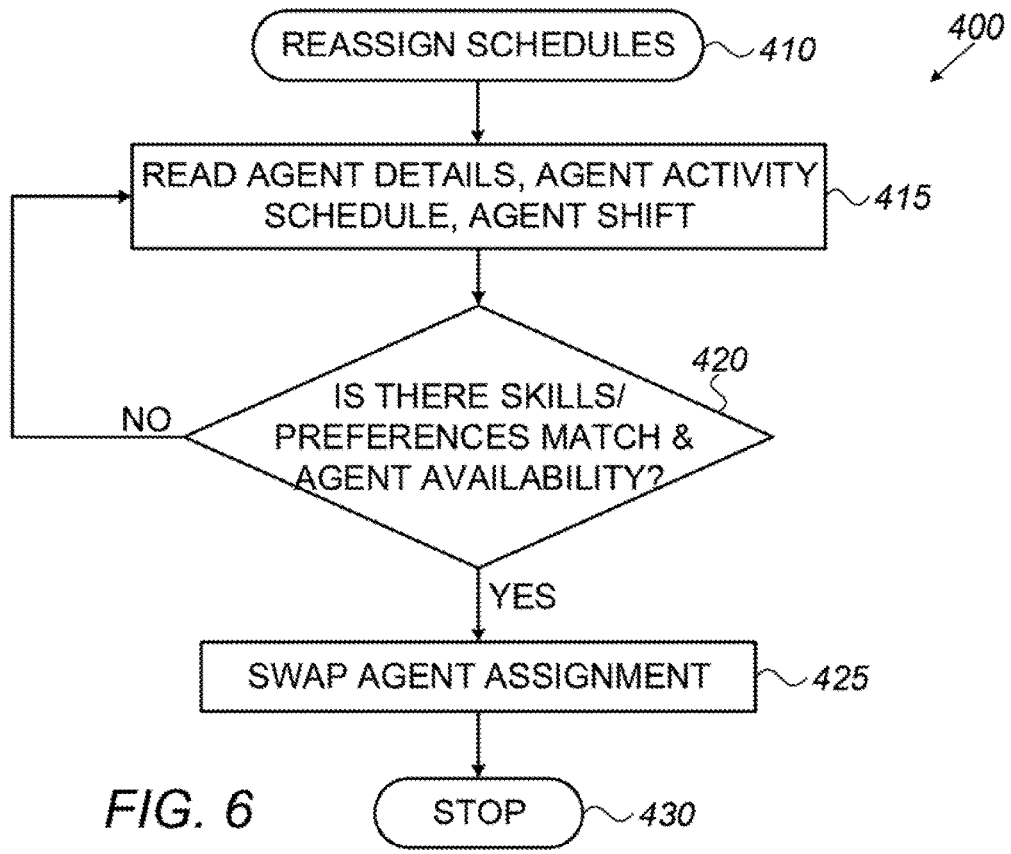
FIG. 6
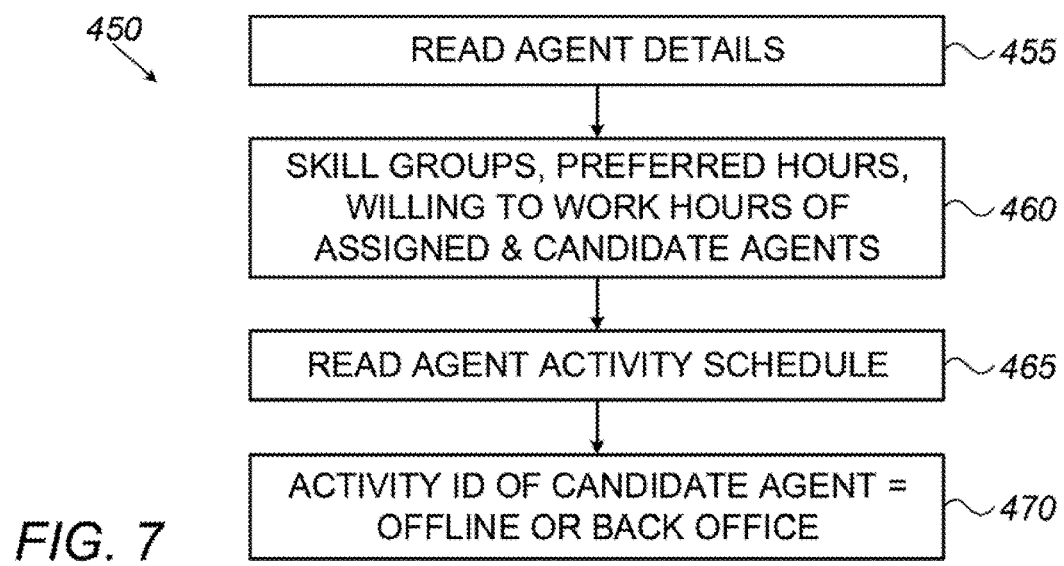
FIG. 7
FIG. 8
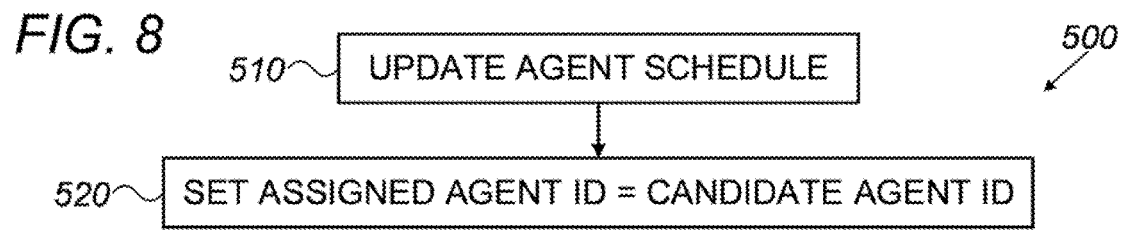

ized method for automatic detection of an availability of an agent to attend a schedule of customer calls in a call center and reassignment thereof. The computerized system may include a processor, and a memory including a database of a plurality of agents with a respective plurality of schedules of customer calls stored thereon. The method may include assessing by the processor an availability of an agent assigned to attend a schedule in a predefined time interval before a starting time of the schedule. If the assigned agent is not available to attend the schedule according to the assessed availability, candidate agent availability may be assessed from the plurality of schedules to participate in the schedule of the unavailable agent. One or more candidate agents may be identified by the processor from the plurality of agents to replace the unavailable assigned agent based on the candidate agent availability. A replacement agent may be assigned by the processor chosen from the one or more candidate agents based on suitable skills or preferences of each of the one or more identified candidate agents. A supervisor may be notified by the processor that the chosen replacement agent will attend the schedule in place of the unavailable assigned agent.

Furthermore, in accordance with some embodiments of the present invention, the method may include updating the schedules of the unavailable assigned agent and the replacement agent.

METHOD AND SYSTEM FOR AUTOMATIC DETECTION OF AGENT AVAILABILITY TO ATTEND A SCHEDULE AND REASSIGNMENT THEREOF

RELATED APPLICATIONS

This application claims priority as a continuation from application Ser. No. 16/792,347 dated Feb. 17, 2020, the disclosure of which is incorporated herein by reference.

FIELD OF THE INVENTION

The present invention relates to a method and system for automatic detection of agent availability to attend a schedule and reassignment thereof.

BACKGROUND OF THE INVENTION

Workforce Management (WFM) schedules of customer calls in a call center are generated for each call center agent. Call center agents may be part-time or full-time workers based in different locations including different countries. Due to unforeseen circumstances, call center agents may not be able to attend a schedule. This may cause staffing problems, such as imbalances of staffing within different workgroups of the call center, particularly when the call center manages thousands of call center agents. Thus, juggling call center agents between different schedules and different workgroups may be critical for restoring efficient operation of the call center.

Thus, it may be desirable to have a system for automatically detecting the absence of call center agents and reassigning the schedules of unavailable agents to other agents.

SUMMARY OF THE INVENTION

There is thus provided, in accordance with some embodiments of the present invention, a computer- Furthermore, in accordance with some embodiments of the present invention, the method may include overriding by the supervisor, the assignment of the replacement agent to attend the schedule.

Furthermore, in accordance with some embodiments of the present invention, assessing the candidate agent availability may include querying the plurality of schedules by a daemon process.

Furthermore, in accordance with some embodiments of the present invention, assessing the availability may include assessing whether the assigned agent is logged on to a work terminal.

Furthermore, in accordance with some embodiments of the present invention, the method may include updating a status of the availability of the assigned agent in an Agent Activity Schedule Table in the database upon each login or logout of the assigned agent.

Furthermore, in accordance with some embodiments of the present invention, the method may include, upon assessing that the assigned agent is not logged on, confirming the availability of the assigned agent by attempting to contact the assigned agent before the starting time of the schedule.

Furthermore, in accordance with some embodiments of the present invention, confirming the availability may include confirming that the assigned agent is not available when the assigned agent does not answer a preconfigured number of telephone calls or returns a negative interactive voice response (IVR).

Furthermore, in accordance with some embodiments of the present invention, assigning the replacement agent may include attempting to contact the replacement agent before the starting time and receiving attendance confirmation from the replacement agent.

Furthermore, in accordance with some embodiments of the present invention, attempting to contact the replacement agent may include initiating a preconfigured number of telephone calls to the replacement agent before the starting time of the schedule.

Furthermore, in accordance with some embodiments of the present invention, the method may include refining schedule reassignment logic executed by the processor to learn from past patterns of availability from the plurality of agents to participate in previously assigned schedules.

Furthermore, in accordance with some embodiments of the present invention, assigning the replacement agent from the one or more candidate agents may include applying the refined schedule reassignment logic based on the past patterns of availability to the one or more candidate agents.

There is further provided, in accordance with some embodiments of the present invention, a computerized system for automatic detection of an availability of an agent to attend a schedule of customer calls in a call center and reassignment thereof. The computerized system may include a processor, and a memory including a database of a plurality of agents with a respective plurality of schedules of customer calls stored thereon. The processor may be configured to assess an availability of an agent assigned to attend a schedule in a predefined time interval before a starting time of the schedule, if the assigned agent is not available to attend the schedule according to the assessed availability, to assess candidate agent availability from the plurality of schedules to participate in the schedule of the unavailable agent, to identify one or more candidate agents from the plurality of agents to replace the unavailable assigned agent based on the candidate agent availability, to assign a replacement agent chosen from the one or more candidate agents based on suitable skills or preferences of each of the one or more identified candidate agents, and to notify a supervisor that the chosen replacement agent will attend the schedule in place of the unavailable assigned agent.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 6 is a flowchart depicting a method for reassigning schedules of unavailable assigned agents, in accordance with some embodiments of the present invention;

FIG. 7 is a flowchart depicting a method for obtaining candidate agent data, in accordance with some embodiments of the present invention; and FIG. 8 is a flowchart depicting a method for swapping the unavailable agent with the replacement agent, in accordance with some embodiments of the present invention.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Embodiments of the present invention described herein may include a method and a system for automatically detecting the availability of an agent to attend a preassigned schedule of customer calls prior to the schedule start time and reassign the schedule automatically. If the agent is determined to be unavailable in a predefined time interval prior to the start time of the schedule, the system may check the availability of one or more potential candidate agents from their respective schedules that may be stored, for example, in a database. The system may assign a replacement agent chosen from the one or more candidate agents based on suitable skills and/or preferences for each of the one or more candidate agents. The system may notify the supervisor that a replacement agent will replace the unavailable agent in the assigned schedules of calls. The supervisor may have the option of overriding the automatic reassignment manually.

Figure 1:
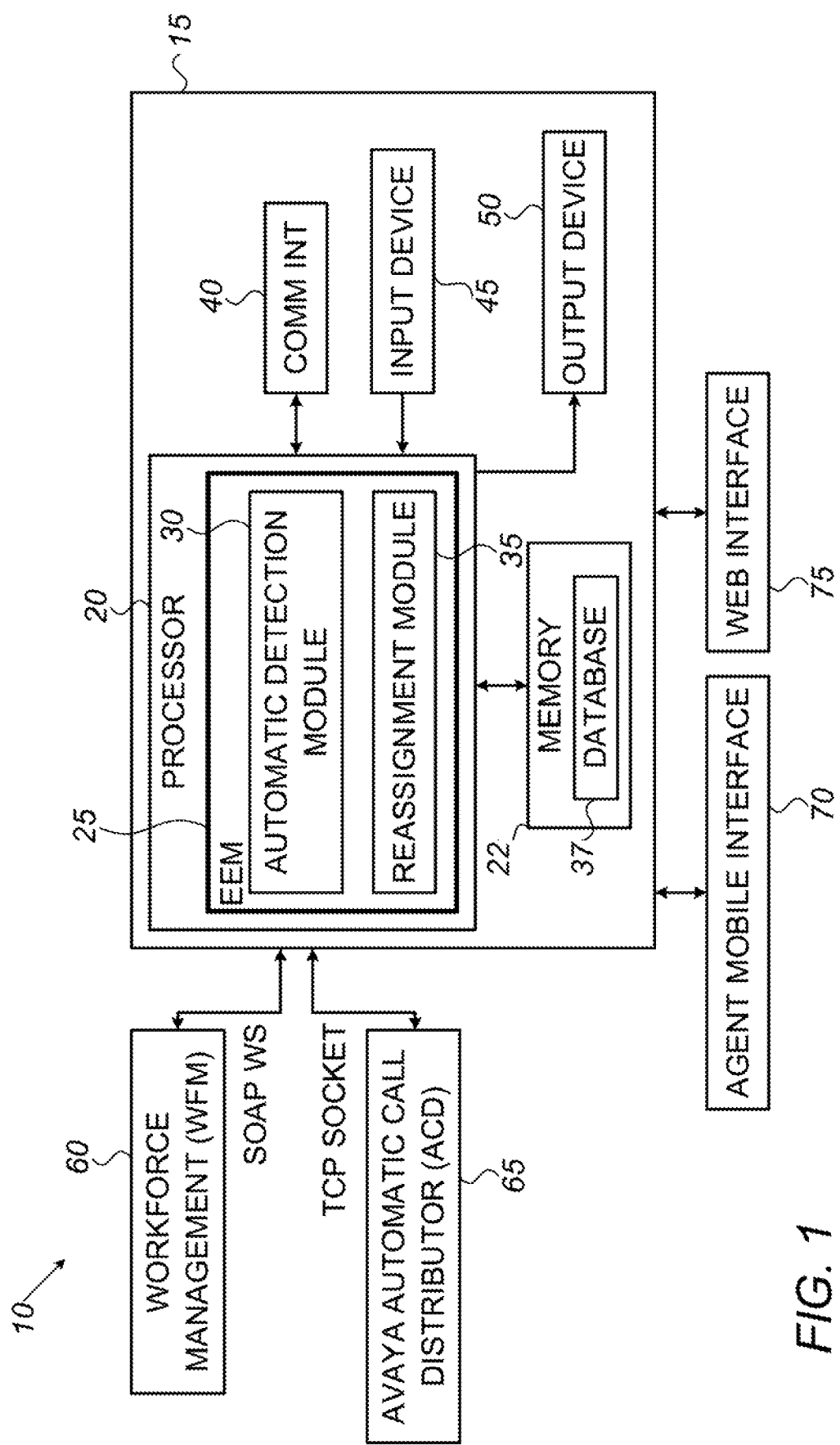
FIG. 1 schematically illustrates a system for automatic detection of an availability of an agent to attend a schedule and reassignment thereof, in accordance with some embodiments of the present invention.

FIG. 1 schematically illustrates a system 10 for automatic detection of an availability of an agent to attend a schedule and reassignment thereof, in accordance with some embodiments of the present invention. System 10 may include a computerized system 15, such a server, for example, communicating with a workforce management (WFM) module 60 using simple object access protocol (SOAP) with web server (WS) addressing (SOAP WS), and an automatic call distributor (ACD) 65, such as an Avaya ACD, for example, over a transmission control protocol (TCP) socket. ACD 65 may be used to route customer calls to the call center to a plurality of agents.

In some embodiments of the present invention, WFM 60 software module may operate on computerized system 15 or may operate on a different computer at a different location communicating with computerized system 15 over a communication network.

In some embodiments of the present invention, computerized system 15 may communicate with an agent mobile interface 70 (e.g., one or more agent mobile interface) such as a cellular phone, smartphone, or tablet.

In some embodiments of the present invention, computerized system 15 may communicate with a web interface 70 (e.g., one or more web interface) on a remote computer, for example, used by an agent.

Computerized system 15 may include a processor 20, a memory 22, a communication module and interface 40, an input device 45 and an output device 50. Processor 20 may include one or more processing units, e.g. of one or more computers. Processor 20 may be configured to operate in accordance with programmed instructions stored in memory 22. Processor 20 may be capable of executing an application for automatically detecting of an availability of an agent to attend a schedule and reassignment of the agent's assigned schedule if the agent is unavailable.

Processor 20 may communicate with output device 50. For example, output device 50 may include a computer monitor or screen. Processor 20 may communicate with a screen of output device 50 to display, for example, a plurality of schedules of a respective plurality of agents, the availability of the plurality of agents, and other suitable parameters for choosing replacement agents to attend assigned schedules. In another example, output device 50 may include a printer, display panel, speaker, or another device capable of producing visible, audible, or tactile output.

Processor 20 may communicate with input device 45. For example, input device 45 may include one or more of a keyboard, keypad, or pointing device for enabling a user to inputting data or instructions for operation of processor 20.

Processor 20 may communicate with memory 22. Memory 22 may include one or more volatile or nonvolatile memory devices. Memory 22 may be utilized to store, for example, programmed instructions for operation of processor 20, data or parameters for use by processor 20 during operation, or results of operation of processor 20. Memory 22 may include a database 37 stored thereon. Database 37 may include, in part, a plurality of agents with a respective plurality of schedules of customer calls.

Memory 22 may include a computer readable medium for storing program instructions for operation of processor 20. In this example, the programmed instructions may take the form of employee engagement manager (EEM) application 25 running on processor 20 including an automatic detection module 30 for assessing the availability of agents to attend their assigned schedules, and a reassignment module 35 capable of identifying candidate agents and assigning replacement agents chosen from the candidate agents to replace unavailable agents.

In operation, processor 20 may execute a method for the automatic detection of an availability of an agent to attend a schedule of customer calls in a call center and reassignment of replacement agents to replace the unavailable agents in their assigned schedules.

Figure 2:
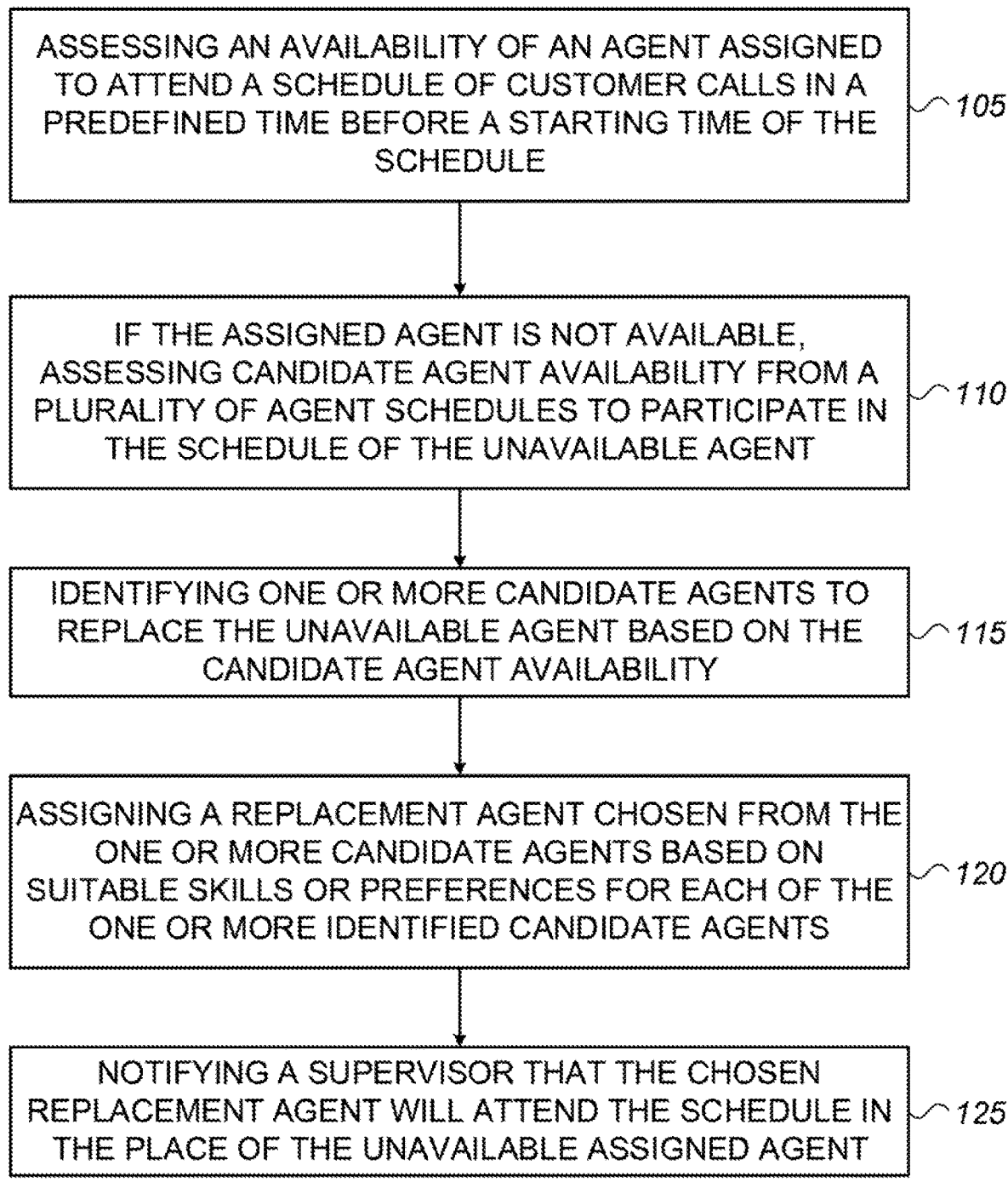
FIG. 2 is a flowchart depicting a method for automatic detection of an availability of an agent to attend a schedule of customer calls in a call center and reassignment thereof, in accordance with some embodiments of the present invention.

FIG. 2 is a flowchart depicting a method 100 for automatic detection of an availability of an agent to attend a schedule of customer calls in a call center and reassignment thereof, in accordance with some embodiments of the present invention. Method 100 may be executed by processor 20 of computerized system 15.

Method 100 may include assessing 105 an availability of an agent assigned to attend a schedule of customer calls in a predefined time interval before a starting time of the schedule.

Method 100 may include, if the assigned agent is not available, assessing 110 candidate agent availability from a plurality of agent schedules to participate in the schedule of the unavailable agent.

Method 100 may include identifying 115 one or more candidate agents to replace the unavailable agent based on candidate agent availability.

Method 100 may include assigning 120 a replacement agent chosen from the one or more candidate agents based on suitable skills or preferences for each of the one or more identified candidate agents.

In some embodiments of the present invention, agent skills for matching suitability between the unavailable assigned agent and a candidate agent for replacing the assigned agent may include, for example, language (fluency in a particular language which will enable the agent to talk to customers from corresponding geography), and domain (e.g., knowledge of specific domain loans, mortgages, investment, etc.).

In some embodiments of the present invention, agent preferences for matching suitability between the unavailable assigned agent and a candidate agent for replacing the assigned agent may include, for example, language of communication, contact mechanism (phone/SMS/email), work extended hours/voluntary time off/do-not-disturb on specific day/time, minimum shift hours, and being open to shift trading with other agents.

In some embodiments of the present invention, tables in database 37 may be used to store these skills and/or preference data per agent. At the time of automatic reassignment, processor 20 may check if the skills and preferences of the unavailable agent may match with those of the candidate agent, so as to ensure alignment between the new agent and potential callers/customers to the call center.

In some embodiments of the present invention, processor 20 may reassign the candidate agent only in case of an exact match of skills and/or preferences with those of the unavailable agent. If any of the skills or preferences do not match, then the automatic reassignment may not occur.

In some embodiments of the present invention, if there are multiple candidate agents in the system (e.g., database) with matching skills or preferences, processor 20 may reassign the unavailable agent with the first matching agent. Once the reassignment is done, processor 20 may not check for more agents.

Method 100 may include notifying 125 a supervisor that the chosen replacement agent will attend the schedule in place of the unavailable assigned agent.

In some embodiments of the present invention, if an agent in a predefined time interval, such as 5 minutes, for example, before the starting time of an assigned schedule time is not available and the agent has not requested to be absent from the assigned schedule, the unavailable agent's schedule may be automatically reassigned.

Processor 20 may execute a background daemon process that may check for prep time (e.g., the starting time) of a plurality of schedules for a respective plurality of agents at predefined checking or sampling intervals, such as every minute, for example. Processor 20 may reassign schedules if the start of prep time is within the predefined time interval, such as the 5 minutes before the schedule, and the assigned agent is not available. The automatic reassignment to a new agent (e.g., replacement agent) may be based on the new agent's availability, skills and preferences. Processor 20 may notify the unavailable agents, the replacement agents, and/or their supervisor about the reassignment. The supervisor may override the automatic reassignment.

In some embodiments of the present invention, WFM module 60 operating on customer (call center) platforms may predict the call volume of the call center based on historical data. This call volume and/or historical call volume data (e.g., for the last month, for example) may be relayed to EEM 25. Furthermore, WFM 60 may also relay schedule and/or agent data to EEM 25. Agent schedules may also include back office work, such as meetings, in addition to the agent receiving customer calls.

Without the embodiments of the present invention as taught herein, schedule reassignment of unavailable agents by matching skills and/or preference matching for thousands of candidate agents in the database, for example, in a typical call center would need to be performed manually, if at all possible. An agent assigned to a schedule that may be unable to submit absence request due to an emergency (e.g. accident, medical emergency, no access to network or any other unexpected situation) may not be timely replaced by a replacement agent before the start of the schedule thus impacting the operational efficiency of the call center.

Therefore, the embodiments taught herein are a computer-based technology improvement for automatically checking by processor 20 if one or more agents in a call center may attend their respective assigned schedule in a predetermined time interval before the start of the schedule. If the one or more agents are determined by processor 20 not to be available (e.g., not logged on), processor 20 may start to automatically reassign the one or more unavailable agents by parsing the availability of a plurality of agents in the database to determine availability. If available, the candidate agents are then suitably matched for skills and/or preferences to determine a suitable replacement agent as depicted in the following flowcharts in the figures below. The embodiments taught herein provide a high availability of agents, even in exceptional circumstances, and improved customer experience.

Figure 3:
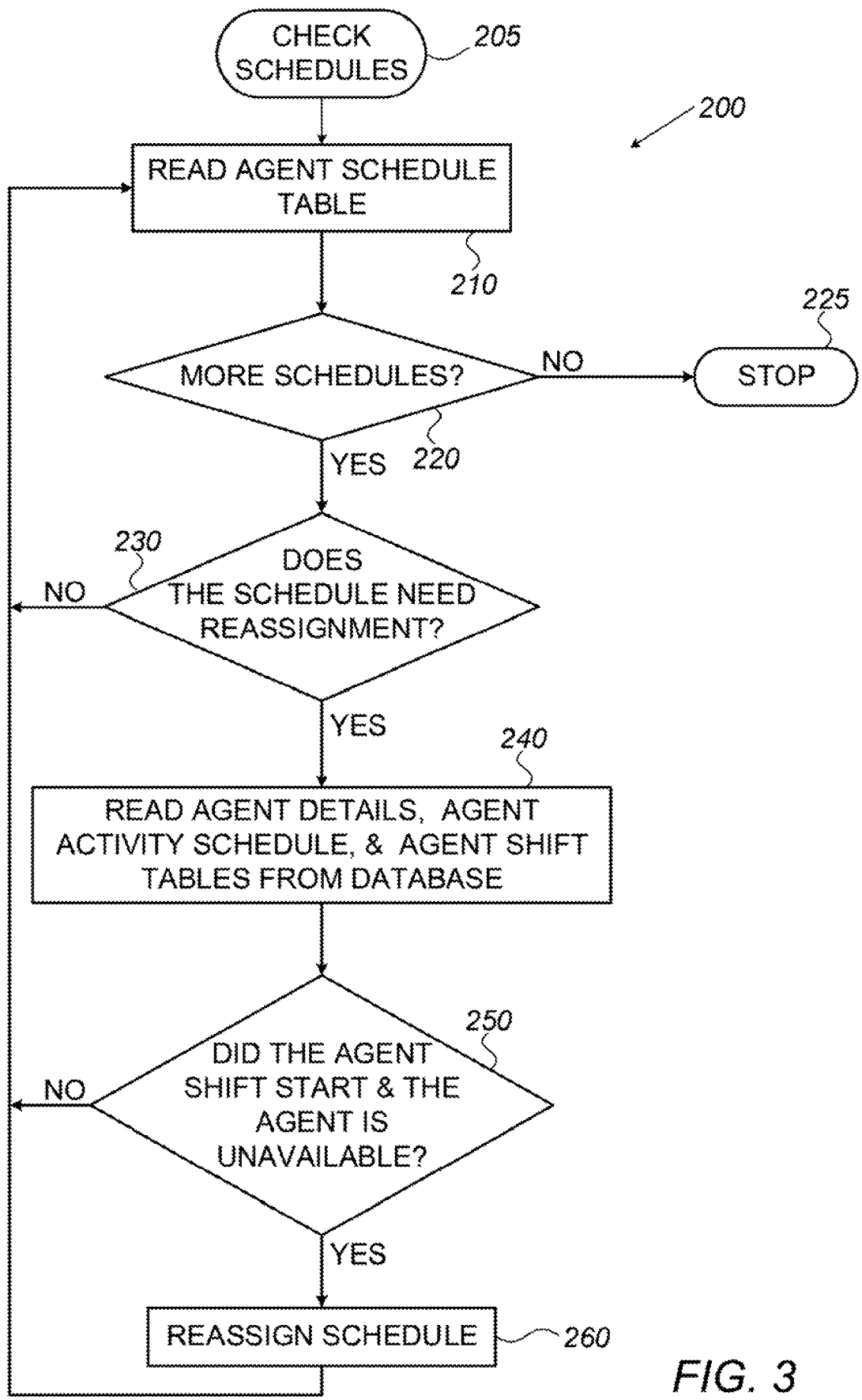
FIG. 3 is a flowchart depicting a method for checking multiple schedules of a respective plurality of agents, in accordance with some embodiments of the present invention.

FIG. 3 is a flowchart depicting a method 200 for checking multiple schedules of a respective plurality of agents, in accordance with some embodiments of the present invention. A "Check Schedules" algorithm 205 may be executed by processor 20. In some embodiments, processor 20 executing a daemon process may call the check schedule algorithm at the predefined checking intervals such as continuously or over a predefined time periods during which the daemon background process operates.

In a reading step 210, processor 20 may read agent schedule table, such as from a database stored in memory 22, for example. In a decision step 220, processor 20 may assess whether there are more schedules to be checked for assigned agent availability. If there are no schedules to be checked, processor 20 stops checking the schedules in a step 225. If there are more schedules to be checked, processor 20 may further assess in a decision step 230 whether the read agent schedule table needs reassignment. If not, processor 20 continues to read the next agent schedule table in step 210. If the schedule needs reassignment, processor 20 may read agent's details, agent activity schedule, and/or agent's shift table in a step 240. In a decision step 250, processor 20 may assess if the shift of the assigned agent is about to start and the assigned agent is unavailable. In some embodiment, the assigned agent may be unavailable when the agent is not logged into system 10, such as via web interface, for example. If available, processor 20 continues to read the next agent schedule table in step 210. If unavailable, processor 20 may reassign the schedule in a step 260 and then may continue to read the next agent schedule table in step 210.

Figure 4:
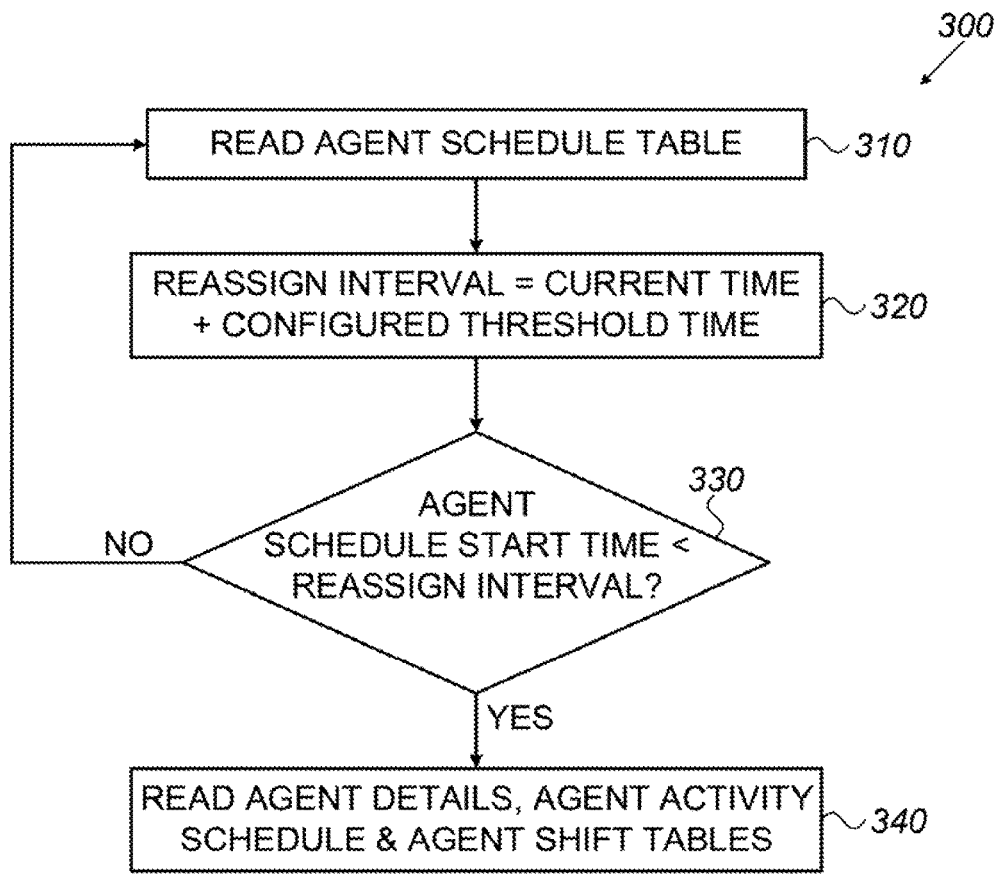
FIG. 4 is a flowchart depicting a method for assessing if a schedule is about to begin, in accordance with some embodiments of the present invention.

FIG. 4 is a flowchart depicting a method 300 for assessing if a schedule is about to begin, in accordance with some embodiments of the present invention. In a step 310, processor 20 may read agent schedule table. The agent schedule table may include assigned agents and their respective schedules. In a step 320, processor may compute a reassignment interval (e.g., reassign interval) as the sum of the current time and a configured threshold time. The configured threshold time may be also referred to herein as the predefined time interval. In a decision step 330, processor 20 may assess whether the starting time of the schedule to be attended by the assigned agent (e.g., agent schedule start time) is less than the reassign interval. If not, processor 20 may continue to read the next agent schedule table in step 310. If so, processor 20 may read agent details, agent activity schedule, and/or agent's shift table in a step 340. If no such schedules are found, then processor 20 may stop executing method 300.

Figure 5:
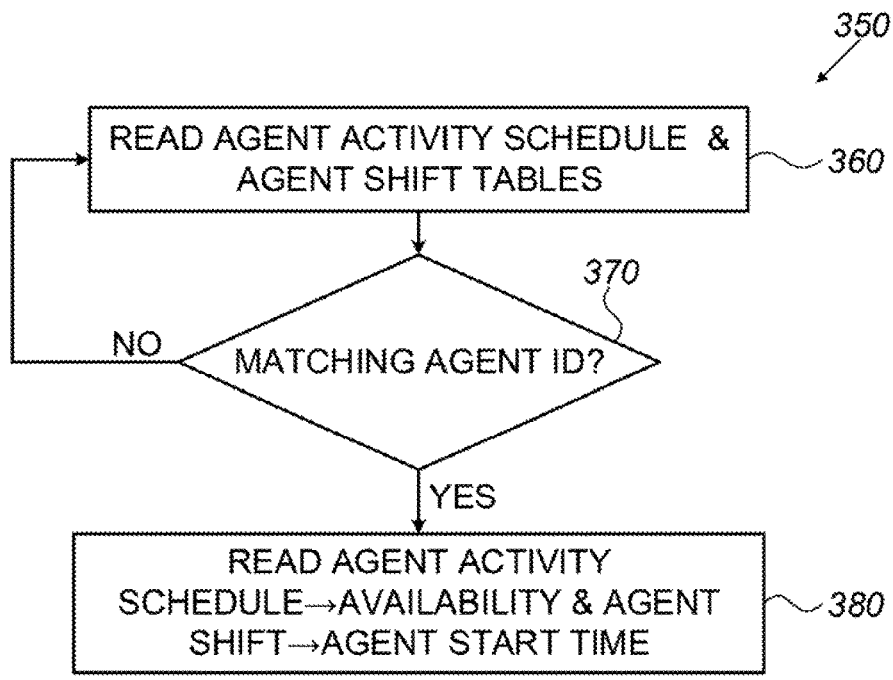
FIG. 5 is a flowchart depicting a method for assessing over a plurality of agents availability to attend schedules about to begin, in accordance with some embodiments of the present invention.

FIG. 5 is a flowchart depicting a method 350 for assessing over a plurality of agents availability to attend schedules about to begin, in accordance with some embodiments of the present invention. FIG. 5 may refer to assessing the availability of assigned agents to attend their respective schedules. For each of one or more schedules identified as about to begin in method 300, processor 20 in a step 360 may read agent details, agent activity schedule, and/or agent's shift table from the schedules of the plurality of agents in database 37. For each assigned Agent ID associated with the one or more schedules identified as about to begin, if the assigned agent is unavailable, processor 20 may assess and identity in a decision step 370 if there is a matching (candidate) agent to attend a schedule of an unavailable agent. If not, processor 20 continues to step 360. If a matching agent is identified in decision step 370, processor 20 in a step 380 may read agent activity schedule, availability and agent shift, and agent start time of the matching agent.

In some embodiments of the present invention, if processor 20 executing EEM 25 identifies one or more schedules for each schedule that is about to begin, processor 20 may read Agent Details, Agent Activity Schedule and Agent Shift tables (e.g., step 340) with matching Agent ID (step 370), and may run a join between the tables. For each Agent ID found in step 370, processor 20 may find rows in Agent Details, Agent Activity Schedule & Agent Shift tables. (e.g., step 380) In some embodiments, a "join between tables" may be a Structured Query Language (SQL) statement where rows from two or more tables, for example, may be selected based on a criteria.

In the exemplary case described here, each row in 'Agent Schedule' table may include details of a schedule along with Agent ID (e.g., the assigned agent for that schedule). Each row in 'Agent Details' table may include details of an agent including Agent ID. Each row in 'Agent Activity Schedule' table may include details of agent activities along with Agent ID. Each row in 'Agent Shift' table may include details of a shift along with Agent ID (e.g., the assigned agent for that shift). When the algorithm determines that a schedule may be reassigned for an agent (e.g., agent John Smith with Agent ID=A001) then processor 20 may fetch details of John Smith & his activities & shift from other tables, for example. In the exemplary case described here, a 'join' may fetch rows from each of these tables corresponding to Agent ID=A001.

Processor 20 may determine if the agent's shift is active based on Agent Start time in the matching row of Agent Shift table in step 380. Processor 20 may determine if the agent is logged in based on agent Availability in the matching row of Agent Activity Schedule table.

If (shift is not active) or (shift is active and if agent is logged in) then processor 20 may continue to process the selected schedules as in the flowchart of FIG. 4. However, if the shift is active (e.g., about to begin) and if agent is not logged in, then processor 20 may call the Reassign Schedule algorithm shown in FIG. 6.

In some embodiments of the present invention, in order to further confirm if the assigned agent is unavailable, processor 20 may initiate calls to agent mobile interface 70 using the Agent's Mobile Phone number in Agent Details table. Processor 20 may attempt to call the agent for a preconfigured number of times. If contact with the agent results in positive IVR response (i.e. agent will attend schedule) then processor 20 assesses that the assigned agent, although still not logged into web interface 75, for example, is available and will attend the assigned schedule nevertheless.

Conversely in some embodiments, if the agent is not contactable, or the agent returns a negative IVR response (e.g., the agent will not attend the schedule), then processor 20 may call "Reassign Schedules" algorithm as shown in FIG. 6 and may read Agent Details and Agent Skill tables to find other agents with matching skills and preferences in database 37. Processor 20 may fetch rows from Agent Details table with matching Preferred Work Hours and Willing to Work Hours, and from Agent Skill table with matching Agent Skill ID and Sub Skill ID.

FIG. 6 is a flowchart depicting a method 400 for reassigning schedules of unavailable assigned agents, in accordance with some embodiments of the present invention. A "Reassign Schedules" algorithm 410 may be executed by processor 20. For one or more matching (candidate) agents identified in the process shown in FIG. 5, processor 20 in a step 415 reads agent details, agent activity schedule, and agent shift. In a decision step 420, processor 20 assesses for the first candidate agent from the one or more candidate agents if there is a skills or preference match and agent availability of the first candidate. If so, processor 20 may assign the first candidate agent as the replacement agent in a step 425 by swapping the agent assignment with that of the unavailable agent. If not, processor 20 assesses for the second candidate agent from the one or more candidate agents if there is a skills or preference match and agent availability of the second candidate. This process may continue until a replacement agent is determined from the one or more candidate agents, or no replacement agent may be assigned if there are no suitable candidate agents from the one or more candidate agents to replace the unavailable agent based on a skills/preference match of the candidate agents with the unavailable agent.

FIG. 7 is a flowchart depicting a method 450 for obtaining candidate agent data, in accordance with some embodiments of the present invention. Method 450 further elaborates on the detailed data acquired by processor 20 in step 415 of method 400 as shown in FIG. 6. In a step 455, processor 20 may read a candidate agent's details from database 37. In a step 460, processor 20 may read skills groups, preferred hours, and willingness to work hours of assigned and candidate agents. In a step 465, processor 20 may read an agent activity schedule. In a step 470, processor 20 may check if the activity II) of the candidate agent is set to OFFLINE or BACK OFFICE (e.g., if not available).

In some embodiments of the present invention, if processor 20 identifies one or more candidate agents as in step 420, before swapping agent assignment in step 425, processor 20 may then initiate calls to the one or more candidate agent(s) using their Mobile Phone number (e.g., agent mobile interface 70) found in Agent Details table to confirm their attendance.

In some embodiments, processor 20 may attempt to call the candidate agent for a preconfigured number of times. If a contact with a candidate agent results in positive IVR response (i.e. agent will attend schedule), then processor 20 may swap the agent assignment as in step 425. If the agent is not contactable or will not attend schedule, then processor 20 may continue contacting the next candidate agent in the list of the one or more candidate agents.

FIG. 8 is a flowchart depicting a method 500 for swapping the unavailable agent with the replacement agent, in accordance with some embodiments of the present invention. In a step 510, processor 20 may update agent schedule in database 37. In a step 520, processor 20 may set assigned (unavailable) agent ID to the candidate agent ID to replace the unavailable assigned agent in the schedule.

In some embodiments of the present invention, EEM 25 may be integrated with an SMS gateway application for notifying 125 a supervisor that the chosen replacement agent will attend the schedule in place of the unavailable assigned agent. (See, for example, Swift SMS Gateway, Barrie, ON, Canada). The SMS gateway application may also be used in the same vein to notify the original assigned agent, the newly assigned replacement agent, and/or the supervisor.

Examples of SOAP web services exposed by the SMS gateway application, such as Swift SMS Gateway, which can be used for this purpose may be implemented as follows:

(1) SendMessageWithReference (string CellNumber, string MessageBody, string AccountKey, string Reference)—This web service may be used to send messages to the original assigned agent, the newly assigned replacement agent, and/or the supervisor. The Reference may be used to correlate the subsequent response, if any, to the outgoing message.

(2) GetIncomingMessagesByReference (string AccountKey, int MessageCount, string Reference)— This web service may receive incoming messages that are in response to the original outgoing message containing the same Reference.

In some embodiments of the present invention, Table I illustrates the full data structures of the data tables used in system 10 (e.g., database 37) as follows:

TABLE I

| Database schema |
| --- |
| Agent Schedule Table |
| Agent Schedule ID<br>Agent ID<br>Agent Start Time<br>Agent End Time<br>Duration Time<br>Start Date |
| Agent Details Table |
| Agent ID<br>First Name<br>Last Name<br>Mobile Phone<br>Email<br>Skill Groups<br>Preferred Hours<br>Willing to Work Hours |
| Agent Skill Table |
| Agent Skill ID<br>Sub Skill ID<br>Agent ID<br>Skill Level |
| Agent Shift Table |
| Agent ID<br>Agent Start Time<br>Agent End Time |
| Agent Activity Schedule Table |
| Agent ID<br>Activity ID<br>Logon Time<br>Work Start Time<br>Work End Time<br>Work Status<br>Availability |
| User Detail History Table |
| User ID<br>IP<br>Login Time<br>Logout Time |

TABLE I-continued

Database schema

Daily Agent Schedule Detail Table

Agent ID
Activity ID
ACD ID
Activity Table

ID
Activity Name
On Shift

In some embodiments of the present invention, processor 20 may update the availability status of the assigned agent in the Agent Activity Schedule Table in database 37 upon each login, logout, or both, of the assigned agent, such as on a work terminal, for example. The availability status may be updated based on agent activity data such as login time, logout time, activity ID and on-shift status as shown in Table I above in the database schema definitions of User Detail History, Daily Agent Schedule Detail and Activity tables that may include the agent activity data.

In some embodiments of the present invention, processor 20 may assess that the agent to attend the assigned schedule of customer calls is not available when verifying that the agent is not logged on to a work terminal, for example. Processor 20 may then attempt to confirm the agent availability by triggering system 10 to call or contact the assigned agent before the starting time of the schedule. Processor 20 may confirm that the assigned agent is not available when the assigned agent does not answer a preconfigured number of telephone calls or returns a negative interactive voice response (IVR).

Similarly in some embodiments of the present invention, in assigning a replacement agent to replace the unavailable assigned agent, processor 20 may attempt to contact the replacement agent before the starting time of the schedule, such as by initiating a preconfigured number of telephone calls to the replacement agent, and receiving attendance confirmation from the replacement agent.

In some embodiments of the present invention, EEM 25 may execute recurrent attempts to contact the assigned agent and/or the candidate agent to replace the assigned agent to attend the schedule assigned to the assigned agent. This may be implemented by integrating EEM 25 with an automatic call distributor/interactive voice response (ACD/IVR) system. (see, for example, NICE inContact CXone IVR, NICE/inContact, Sandy, Utah).

In some embodiments of the present invention, EEM 25 may be integrated with the NICE inContact CXone IVR as follows:

1. Register each hosted instance of EEM as a non-billable tenant of NICE inContact CXone IVR with WorkFlexAdmin as the user.
2. Design IVR script using NICE inContact Studio.
3. The Studio provides a user interface UI for designing the script as follows. The script may reside on tenant space on NICE inContact CXone cluster.
   a. Define number of attempts to call on no response
   b. Define IVR options—'Will attend schedule', 'Will not attend schedule' and 'Exit call'
   c. Call EEM REST web service Handle_No_Response if no response after number of attempts as defined in #3b above.
   d. Call EEM REST web service Handle_Response if agent responds via IVR 4. Login to inContact CXone system as WorkFlexAdmin and get back Refresh URL along with API authentication token
5. Create agent session via Session API by sending authentication token as parameter and get session ID back.
6. If the authentication token has expired, then call Refresh URL to get a new token.
7. Call script (as designed in #3) via API URL by sending session ID and agent mobile number as parameters.
8. Handle_No_Response and Handle_Response web services may be exposed by EEM to receive output of script execution.
9. Handle_No_Response may call Reassign Schedule 410.
10. Handle_Response may not take any action if the agent response is 'Will attend Schedule'; otherwise EEM 25 calls Reassign Schedule 410.

In some embodiments of the present invention, reassignment module 35 may implement machine learning algorithms for schedule reassignment. Reassignment module 35 may be configured to learn from past patterns of agents' availability prior to the schedule start time instead of fully relying on preconfigured threshold time or the predefined time interval before the starting time of the schedule. Reassignment module 35 may implement this as follows:

1. Define a new table Agent_Availability_Pattern with 3 columns, for example—Agent_ID, Date_of Availability, and Time_Of_Availability so as to save the availability pattern for each agent. A new row may be inserted into this table per agent, per day, for example.
2. Each time an agent logs in, capture the current date and time as CurrDate and CurrTime, respectively.
3. Query Agent Schedule table to get Agent Start Time.
4. Compute difference between Agent Start Time and CurrTime as CurrTimeDiff in minutes.
5. Update Agent Availability_Pattern table for the Agent_ID with CurrDate and CurrTimeDiff as Date_of_Availability and Time_of_Availability, respectively.
6. Refine Check Schedule (with reference to the flowcharts and algorithms with reference to FIGS. 3-5) to compute median of Time_of_Availability for the agent which may be used as the Reassignment Interval, so as to eliminate outliers by customizing the threshold time per agent.

In storing one row per agent per day in the Agent_Availability_Pattern table, the table may quickly grow very large. In some embodiments, periodic purging of this table may be performed, for example, on rows older than 1 month. Therefore, in this exemplary embodiment, the pattern per agent may be based on data for the last 1 month.

Stated differently, computerized system 15 may use machine learning to customize reassignment threshold time per agent based on their availability pattern. For example, agent A may log in half hour before the start of the assigned schedule, agent B may log in 15 minutes before the start of the assigned schedule, or agent C may log in 5 minutes before the start of the assigned schedule. Processor 20 may determine the threshold time (e.g., the predefined time interval before the starting time of the schedule) at which to trigger reassignment based on the pattern of availability per agent so to avoid unnecessary reassignment.

In some embodiments of the present invention, a computerized method for automatic detection of an availability of an agent to attend a schedule of customer calls in a call center and reassignment thereof. The computerized system may include a processor and a memory. The memory may include a database of a plurality of agents with a respective plurality of schedules of customer calls stored thereon. The method may include assessing by the processor an availability of an agent assigned to attend a schedule in a predefined time interval before a starting time of the schedule. If the assigned agent is not available to attend the schedule according to the assessed availability, candidate agent availability may be assessed from the plurality of schedules to participate in the schedule of the unavailable agent. One or more candidate agents may be identified by the processor from the plurality of agents to replace the unavailable assigned agent based on the candidate agent availability. A replacement agent may be assigned by the processor chosen from the one or more candidate agents based on suitable skills or preferences of each of the one or more identified candidate agents. A supervisor may be notified by the processor that the chosen replacement agent will attend the schedule in place of the unavailable assigned agent.

In some embodiments of the present invention, the method may include updating the schedules of the unavailable assigned agent and the replacement agent.

In some embodiments of the present invention, the method may include overriding by the supervisor, the assignment of the replacement agent to attend the schedule.

In some embodiments of the present invention, assessing the candidate agent availability may include querying the plurality of schedules by a daemon process.

In some embodiments of the present invention, assessing the availability may include assessing whether the assigned agent is logged on to a work terminal.

In some embodiments of the present invention, the method may include updating a status of the availability of the assigned agent in an Agent Activity Schedule Table in the database upon each login, logout, or both of the assigned agent.

In some embodiments of the present invention, the method may include, upon assessing that the assigned agent is not logged on, confirming the availability of the assigned agent by attempting to contact the assigned agent before the starting time of the schedule.

In some embodiments of the present invention, confirming the availability may include confirming that the assigned agent is not available when the assigned agent does not answer a preconfigured number of telephone calls or returns a negative interactive voice response (IVR).

In some embodiments of the present invention, assigning the replacement agent may include attempting to contact the replacement agent before the starting time and receiving attendance confirmation from the replacement agent.

In some embodiments of the present invention, attempting to contact the replacement agent may include initiating a preconfigured number of telephone calls to the replacement agent before the starting time of the schedule.

In some embodiments of the present invention, the method may include refining schedule reassignment logic executed by the processor to learn from past patterns of availability from the plurality of agents to participate in previously assigned schedules.

In some embodiments of the present invention, assigning the replacement agent from the one or more candidate agents may include applying the refined schedule reassignment logic based on the past patterns of availability to the one or more candidate agents.

In some embodiments of the present invention, a computerized system for automatic detection of an availability of an agent to attend a schedule of customer calls in a call center and reassignment thereof may include a processor and a memory. The memory may include a database of a plurality of agents with a respective plurality of schedules of customer calls stored thereon. The processor may be configured to assess an availability of an agent assigned to attend a schedule in a predeformed time interval before a starting time of the schedule, if the assigned agent is not available to attend the schedule according to the assessed availability, to assess candidate agent availability from the plurality of schedules to participate in the schedule of the unavailable agent, to identify one or more candidate agents from the plurality of agents to replace the unavailable assigned agent based on the candidate agent availability, to assign a replacement agent chosen from the one or more candidate agents based on suitable skills or preferences of each of the one or more identified candidate agents, and to notify a supervisor that the chosen replacement agent will attend the schedule in place of the unavailable assigned agent.

In some embodiments of the present invention, the processor may be configured to update the schedules of the unavailable assigned agent and the replacement agent.

In some embodiments of the present invention, the processor may be configured to override by the supervisor, the assignment of the replacement agent to attend the schedule.

In some embodiments of the present invention, the processor may be configured to assess the candidate agent availability by querying the plurality of schedules by a daemon process.

In some embodiments of the present invention, the processor may be configured to assess the availability by assessing whether the assigned agent is logged on to a work terminal.

In some embodiments of the present invention, the processor may be configured, upon assessing that the assigned agent is not logged on, to confirm the availability of the assigned agent by attempting to contact the assigned agent before the starting time of the schedule.

In some embodiments of the present invention, the processor may be configured to confirm the availability by confirming that the assigned agent is not available when the assigned agent does not answer a preconfigured number of telephone calls or returns a negative interactive voice response (IVR).

In some embodiments of the present invention, the processor may be configured to assign the replacement agent by attempting to contact the replacement agent before the starting time and receiving attendance confirmation from the replacement agent.

In some embodiments of the present invention, the processor may be configured to attempt to contact the replacement agent by initiating a preconfigured number of telephone calls to the replacement agent before the starting time of the schedule.

In some embodiments of the present invention, the processor may be configured to refine schedule reassignment logic executed by the processor to learn from past patterns of availability from the plurality of agents to participate in previously assigned schedules.

In some embodiments of the present invention, the processor may be configured to assign the replacement agent from the one or more candidate agents by applying the refined schedule reassignment logic based on the past patterns of availability to the one or more candidate agents.

It should be understood with respect to any flowchart referenced herein that the division of the illustrated method into discrete operations represented by blocks of the flowchart has been selected for convenience and clarity only.

Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A computerized method for automatic detection of absence of an agent to attend a preassigned schedule of customer calls in a call center and reassignment thereof to another agent, the method comprising:
    in a computerized system comprising a processor, and a memory including a database of a plurality of agents with a respective plurality of schedules of customer calls stored thereon, querying the plurality of schedules to assess by the processor an availability of an agent to attend a preassigned schedule in a predefined time interval before a starting time of the preassigned schedule,
    wherein an agent is assessed as absent when the agent is not logged on terminal;
    if the agent is assessed as absent according to the assessment, assessing by the processor, candidate agent availability from the database of the plurality of agents to participate in the schedule of the absent agent;
    identifying by the processor one or more candidate agents from the plurality of available agents in the database to replace the agent that is absent based on the candidate agent availability assessment;
    assigning by the processor a replacement agent chosen from the one or more candidate agents based on suitable skills or preferences of each of the one or more identified candidate agents; and
    notifying by the processor, a supervisor that the chosen replacement agent will attend the preassigned schedule in place of the absent agent.

2. The method according to claim 1, wherein each agent is further assessed as absent according to past patterns of availability of the agent to participate in previously assigned schedules.

3. The method according to claim 1, further comprising updating the schedules of the agent that is absent and the replacement agent.

4. The method according to claim 1, further comprising receiving an instruction from the supervisor, to override the assignment of the replacement agent to attend the preassigned schedule.

5. The method according to claim 1, wherein the querying of the plurality of schedules is performed by a daemon process.

6. The method according to claim 1, further comprising updating a status of the availability of the agent in an Agent Activity Schedule Table in the database upon each login or logout of the agent.

7. The method according to claim 1, further comprising, upon assessing that the agent is not logged on, confirming the availability of the agent by attempting to contact the agent before the starting time of the preassigned schedule.

8. The method according to claim 7, wherein confirming the availability comprises confirming that the agent is not available when the agent does not answer a preconfigured number of calls to an agent mobile interface or returns a negative interactive voice response (IVR).

9. The method according to claim 1, wherein assigning the replacement agent comprises attempting to contact the replacement agent before the starting time and receiving attendance confirmation from the replacement agent.

10. The method according to claim 9, wherein attempting to contact the replacement agent comprises initiating a preconfigured number of calls to an agent mobile interface to the replacement agent before the starting time of the preassigned schedule.

11. The method according to claim 1, wherein assigning the replacement agent from the one or more candidate agents comprises applying the refined schedule reassignment logic based on the past patterns of availability to the one or more candidate agents.

12. A computerized system for automatic detection of absence of an agent to attend a preassigned schedule of customer calls in a call center and reassignment thereof to another agent, the system comprising:
    a memory including a database of a plurality of agents with a respective plurality of schedules of customer calls stored thereon, and
    a processor configured to:
    (i) query the plurality of schedules to assess an availability of an agent to attend a preassigned schedule in a predefined time interval before a starting time of the preassigned schedule;
        if the agent is assessed as absent according to the assessed availability,
    (ii) assess candidate agent availability from the database of the plurality of agents to participate in the preassigned schedule of the agent that is absent, wherein an agent is assessed as absent when the agent is not logged on terminal;
    (iii) identify one or more candidate agents from the plurality of agents to replace the agent that is absent based on the candidate agent availability assessment;
    (iv) assign a replacement agent chosen from the one or more candidate agents based on suitable skills or preferences of each of the one or more identified candidate agents; and (v) notify a supervisor that the chosen replacement agent will attend the schedule in place of the absent agent.

13. The system according to claim 12, wherein the processor is configured to update the schedules of the agent that is absent and the replacement agent.

14. The system according to claim 12, wherein the processor is configured to receive an instruction from the supervisor, to override the assignment of the replacement agent to attend the schedule.

15. The system according to claim 12, wherein the processor is configured to query the plurality of schedules by a daemon process.

16. The system according to claim 12, wherein the processor is configured to update a status of the availability of the agent in an Agent Activity Schedule Table in the database upon each login or logout of the agent.

17. The system according to claim 12, wherein the processor is configured, upon assessing that the agent is not logged on, to confirm the availability of the agent by attempting to contact the agent before the starting time of the schedule.

18. The system according to claim 17, wherein the processor is configured to confirm the availability by confirming that the agent is not available when the agent does not answer a preconfigured number of telephone calls or returns a negative interactive voice response (IVR).

19. The system according to claim 12, wherein the processor is configured to assign the replacement agent by attempting to contact the replacement agent before the starting time and receiving attendance confirmation from the replacement agent.

20. The system according to claim 19, wherein the processor is configured to attempt to contact the replacement agent by initiating a preconfigured number of telephone calls to the replacement agent before the starting time of the preassigned schedule.

21. The system according to claim 12, wherein the processor is configured to assign the replacement agent from the one or more candidate agents by applying the refined schedule reassignment logic based on the past patterns of availability to the one or more candidate agents.

22. The system according to claim 12, wherein each agent is further assessed as absent according to past patterns of availability of the agent to participate in previously assigned schedules.

23. A computerized method for automatic detection of absence of an agent to attend a preassigned schedule of customer calls in a call center and reassignment thereof to another agent, the method comprising:

in a computerized system comprising a processor, and a memory including a database of a plurality of agents with a respective plurality of schedules of customer calls and an Agent Activity Schedule Table database stored thereon, querying the plurality of schedules to assess by the processor an availability of an agent to attend a preassigned schedule in a predefined time interval before a starting time of the preassigned schedule, wherein an agent is assessed as absent by querying the Agent Activity Schedule Table database to check the availability of the agent;

if the agent is assessed as absent according to the assessment, assessing by the processor, candidate agent availability from the database of the plurality of agents to participate in the schedule of the absent agent;

identifying by the processor one or more candidate agents from the plurality of available agents in the database to replace the agent that is absent based on the candidate agent availability assessment; and assigning by the processor a replacement agent chosen from the one or more candidate agents based on suitable skills or preferences of each of the one or more identified candidate agents; and notifying by the processor, a supervisor that the chosen replacement agent will attend the preassigned schedule in place of the absent agent.

* * * * *